United States Patent
Lee et al.

(10) Patent No.: US 8,010,844 B2
(45) Date of Patent: Aug. 30, 2011

(54) FILE MUTATION METHOD AND SYSTEM USING FILE SECTION INFORMATION AND MUTATION RULES

(75) Inventors: Dong Hyun Lee, Daejeon (KR); Dae Sik Choi, Daejeon (KR); Do Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 637 days.

(21) Appl. No.: 12/037,985

(22) Filed: Feb. 27, 2008

(65) Prior Publication Data

US 2008/0307006 A1    Dec. 11, 2008

(30) Foreign Application Priority Data

Jun. 5, 2007    (KR) .................. 10-2007-0055104

(51) Int. Cl.
*G06F 11/00* (2006.01)
(52) U.S. Cl. .................. 714/38.1; 717/124; 726/22
(58) Field of Classification Search .............. 714/38, 714/38.1, 38.14; 717/124, 127; 726/22, 726/24, 25
See application file for complete search history.

(56) References Cited

U.S. PATENT DOCUMENTS

| | | | |
|---|---|---|---|
| 6,766,475 B2 * | 7/2004 | Segal et al. .................. | 714/38 |
| 7,165,241 B2 * | 1/2007 | Manda et al. .................. | 717/124 |
| 7,284,273 B1 * | 10/2007 | Szor .................. | 726/24 |
| 7,594,142 B1 * | 9/2009 | O'Leary et al. .................. | 714/38 |
| 7,644,441 B2 * | 1/2010 | Schmid et al. .................. | 726/24 |
| 7,743,281 B2 * | 6/2010 | Conger et al. .................. | 714/38 |
| 2005/0015673 A1 * | 1/2005 | Plesko et al. .................. | 714/38 |
| 2006/0253739 A1 * | 11/2006 | Godefroid et al. .............. | 714/38 |
| 2008/0126869 A1 * | 5/2008 | Kraft et al. .................. | 714/37 |
| 2008/0170684 A1 * | 7/2008 | Widjaja et al. .................. | 380/2 |
| 2008/0256340 A1 * | 10/2008 | Conger et al. .................. | 712/217 |
| 2008/0301813 A1 * | 12/2008 | Neystadt et al. .................. | 726/25 |

FOREIGN PATENT DOCUMENTS

KR    1020040075464    8/2004

OTHER PUBLICATIONS

Michael Sutton et al. "The Art of File Format Fuzzing." Idefense Labs. BlackHat USA Conference, 2005.

* cited by examiner

*Primary Examiner* — Yolanda L Wilson
(74) *Attorney, Agent, or Firm* — Ladas & Parry LLP (57) ABSTRACT

Provided are a file mutation method and a system using file section information and mutation rules. The file mutation system includes: a file section information extraction module obtaining file section information with respect to a sample file of a known file format; a file section information production module producing file section information with respect to a sample file of an unknown format; a mutation rule production module receiving a user input that a mutation rule is applied and producing a mutation rule, the mutation rule defining a mutation function that is to be applied to each data type; and a file mutation module receiving the sample file and producing a plurality of test case files that are created by mutating the sample file through the file section information processed in the file section information extraction module and the file section information production module and the mutation rule from the mutation rule production module.

18 Claims, 7 Drawing Sheets

FILE MUTATION METHOD AND SYSTEM USING FILE SECTION INFORMATION AND MUTATION RULES

BACKGROUND OF THE INVENTION

1. Field of the Invention

The present invention relates to a file mutation method and a system using file section information and mutation rules, and more particularly, to a file mutation method and a system using file section information and mutation rules and producing a test case for file fuzzing that is one of software vulnerability testing methods.

2. Description of the Related Art

Fuzzing is a representative black box testing method for checking a security weak point of software. According to the basic idea of the fuzzing, defects that software cannot fix can occur when various random data are inputted into software to perform numerous tests to detect abnormal behaviors during the tests. The kinds of the fuzzing are diversely classified depending on diverse targets and inputted data.

File fuzzing is a fuzzing method using a file as input data. The file fuzzing is largely divided into a file generating process, a file executing process, and an exception monitoring process. The file generating process generates a test case of the fuzzing. The file executing process sequentially executes the generated test cases through object software. The exception monitoring process detects and records abnormal behaviors such as an exception or error situation during execution. The present invention is one of file generating methods.

The file generating methods include creation and mutation. The creation generates a new file from nothing. The mutation mutates a portion of an original sample file and creates another file. The file generating method has the high degree of difficulty for realization and is limited to a specific file type. Furthermore, because an accurate analysis for a file format must be preceded to generate a meaningful test case, a file mutation method is generally used. However, many false positives occur because the file mutation method does not consider data correlations. Additionally, efficiency is decreased due to dependency of randomness, and computing resource is exceedingly wasted because mass test cases need to be created and tested.

SUMMARY OF THE INVENTION

Accordingly, the present invention is directed to a file mutation method and a system using file section information and mutation rules, which substantially obviates one or more problems due to limitations and disadvantages of the related art.

It is an object of the present invention to provide a file mutation method and a system using file section information and mutation rules, which have expandability for processing various kinds of file formats and generate meaningful test cases to reduce false positives and increase test efficiency.

It is another object of the present invention to provide a file mutation method and a system using file section information and mutation rules. The file section information improves the file mutation method and interprets what kind of data type a value dividing and filling each section of a sample file is and the mutation rules defines the mutation method according to each data type.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a file mutation system using file section information and mutation rules. The file mutation system includes: a file section information extraction module obtaining file section information with respect to a sample file of a known file format; a file section information production module producing file section information with respect to a sample file of an unknown format; a mutation rule production module receiving a user input that a mutation rule is applied and producing a mutation rule, the mutation rule defining a mutation function that is to be applied to each data type; and a file mutation module receiving the sample file and producing a plurality of test case files that are created by mutating the sample file through the file section information processed in the file section information extraction module and the file section information production module and the mutation rule from the mutation rule production module.

In another aspect of the present invention, there is provided a file mutation method using file section information and mutation rules. The file mutation method includes: obtaining file section information with respect to a sample file of a known file format in a file section information extraction module; producing file section information with respect to a sample file of an unknown file format in the file section information production module; producing a mutation rule defining a mutation function that is applied to each data type by receiving mutation information that the mutation rule is applied in the mutation rule production module; and receiving the sample file as an input to produce a plurality of test case files that are created by mutating the sample files through the file section information and the mutation rule in a file mutation module.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

First, Table 1 schematizes file section information. Table 1 is as follows.

TABLE 1

| ADDR | LENGTH | ID | TYPE |
|------|--------|----|------|
| ADDR | LENGTH | ID | TYPE |
| ADDR | LENGTH | ID | TYPE |
| ADDR | LENGTH | ID | TYPE |
| ADDR | LENGTH | ID | TYPE |
| ... | ... | ... | ... |

Referring to Table 1, a constituent unit of file section information includes an ADDR field 203, a LENGTH field 204, an ID field 205, and a TYPE filed 206, and one row of Table 1 represents one file section information.

More specifically, the ADDR field 203 represents a starting address of a corresponding section of a sample file. The LENGTH field 204 represents a corresponding section size of a sample file. The ID field 205 represents an original number indicating a corresponding section of a sample file. A TYPE field 206 represents data types used in a corresponding section of a sample file. Examples of the TYPE field 206 are integers, strings, and binary data. When various TYPE fields 206 are applied to one section, a plurality of constituent units are used for description.

The file section information is total information for each section constituting a file and includes the ADDR field 203 representing a starting address for a section of the file, the LENGTH field 204 representing the size of a field, the ID field 205 representing the name of a field, and the TYPE field 206 representing the type of a field for data used in a corresponding section.

Figure 1:
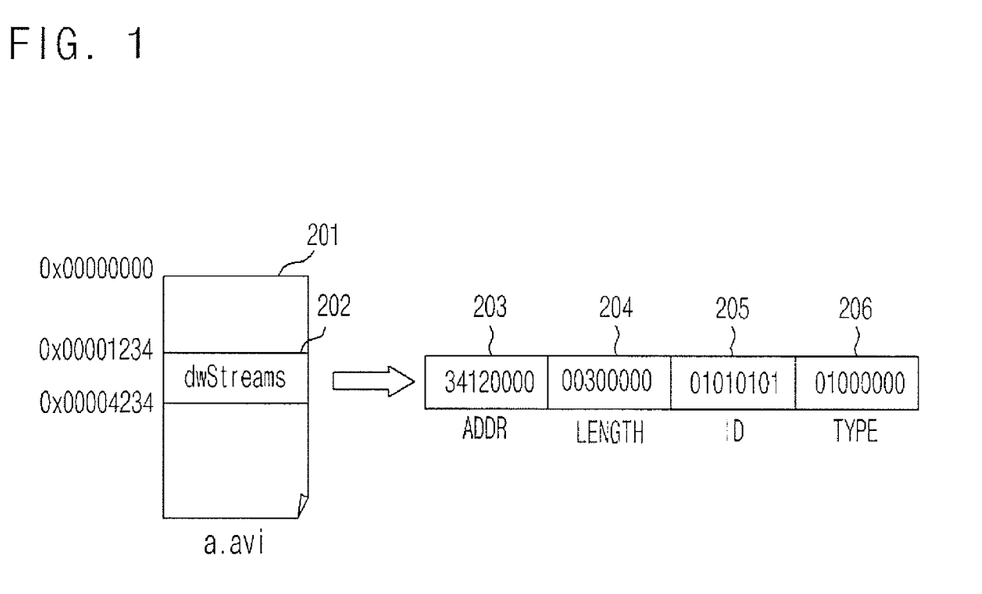
FIG. 1 is a data format diagram illustrating file section information according to one embodiment of the present invention.

FIG. 1 is a data format diagram illustrating file section information according to one embodiment of the present invention.

Referring to FIG. 1, a.avi is a target file 201 to be inputted of a sample file. The dwStreams 202, i.e., one of sections, has a starting address of 0x00001234 and an ending address of 0x00004234. Content of data is the number of streams. At this point, examples that the number is converted into file section information are the ADDR field 203, the LENGTH field 204, the ID field 205, and the TYPE field 206 as illustrated in FIG. 1. The ADDR field 203 has a value indicating that a starting address 0x00001234 of the dwStreams 202 is represented through a little-endian method. The LENGTH field 204 has a value indicating that the section size obtained by a difference between the starting address and the ending address of the dwStreams 202 is represented through the little-endian method. The ID field 205 and the TYPE field 206 are arbitrary values set for examples.

The ID field 205 needs to be an original number representing the dwStreams 202, and the TYPE field 206 needs to be an integer type because data of the dwStreams 202 is the content for the number of streams.

A mutation rule defines a data type and a mutation method applied to a corresponding data type, i.e., a function. Examples of the mutation method may include a random value insertion, a large number insertion, a small number insertion, a long string insertion, and a special character insertion. Those are represented as functions. Various mutation methods for one data type may be defined, and one mutation method may be applied to the various data types.

Figure 2:
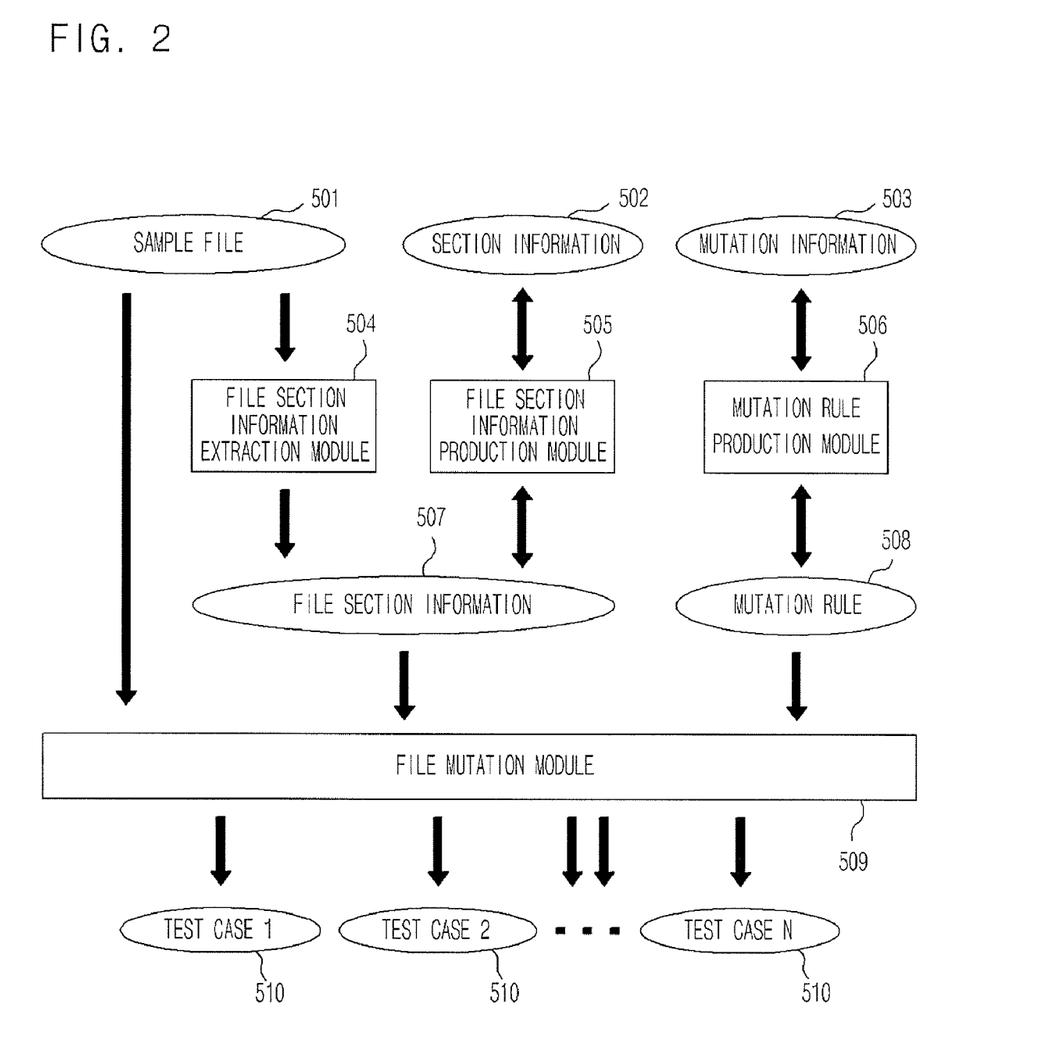
FIG. 2 is a block diagram illustrating a file mutation method according to one embodiment of the present invention.

Table 2 schematizes a mutation rule. As illustrated in FIG. 2, a constituent unit of a mutation rule includes a type field and a mutation data field in a row, and a plurality of constituent units constitute a mutation rule.

TABLE 2

| TYPE (#1) | MUTATION DATA (#1) |
|-----------|--------------------|
| TYPE (#2) | MUTATION DATA (#2) |
| TYPE (#3) | MUTATION DATA (#3) |
| TYPE (#4) | MUTATION DATA (#4) |
| ... | ... |

A TYPE field has a value identical to that of file section information, and serves as a foreign key used in a database. A mutation data field represents a mutation method applied to a corresponding TYPE field. According to the mutation rule of FIG. 3, MUTATION DATA (#1) is applied to TYPE (#1), MUTATION DATA (#2) is applied to TYPE (#2), MUTATION DATA (#3) is applied to TYPE (#3), and MUTATION DATA (#4) is applied to TYPE (#4).

Table 3 represents the mutation rule of Table 2 in detail.

TABLE 3

| 00000000 | Random Variable |
|----------|-----------------|
| 01000000 | Integer Overflow Data Set |
| 02000000 | Buffer Overflow Data Set |
| 04000000 | Special String Data Set |
| ... | ... |

According to Table 3, when a TYPE field value is 00000000, a random value is inserted into a MUTATION DATA field section. When a TYPE field value is 01000000, data causing integer overflow is inserted into a MUTATION DATA field section. When a TYPE field value is 02000000, data causing buffer overflow is inserted into a MUTATION DATA field section. When a TYPE field value is 04000000, data including special character is inserted into a MUTATION DATA field section.

The present invention differently applies a mutation method to each section of a file according to a data type through file section information and mutation rules. Through this, more accurate and efficient data cases can be generated.

FIG. 2 is a block diagram illustrating a file mutation method according to one embodiment of the present invention.

Referring to FIG. 2, a structure of the present invention largely includes a file section information extraction module 504, a file section information production module 505, a mutation rule production module 506, and a file mutation module 509.

The file mutation module 509 receives a sample file 501 as the original copy and generates a plurality of test cases 510 after converting the sample file 501 through the file section information 507 processed in the file section information extraction module 504 or the file section information production module 505 and the mutation rules 508 processed in the mutation rule production module 506. The process of creating the plurality of test cases will be described in more detail with reference to FIG. 6.

A file type of the sample file 501 may be divided into a known format and a unknown file format. In the case of the known file format, the obtaining of the file section information 507 can be automated. Accordingly, the file section information extraction module 504 automatically obtains the file section information 507 with respect to the file of the known file format.

In the case of the unknown file format, because it is difficult to automate the obtaining of the file section information 507, the file section information production module 505 supports to produce the file section information 507 that is created through the section information 502. The file section information production module 505 is used for replacing a portion that is not realized in the file section information extraction module 504 and for editing the previously-produced file format information 507 even in the case of the known file format.

The mutation rule production module 506 receives mutation information 503 that a mutation rule is applied in order to create a mutation rule 508 defining a mutation function applied to each data type or in order to edit the previously-produced mutation rule 508. The created mutation rule 508 is stored in a format of Table 2 or Table 3.

Figure 3:
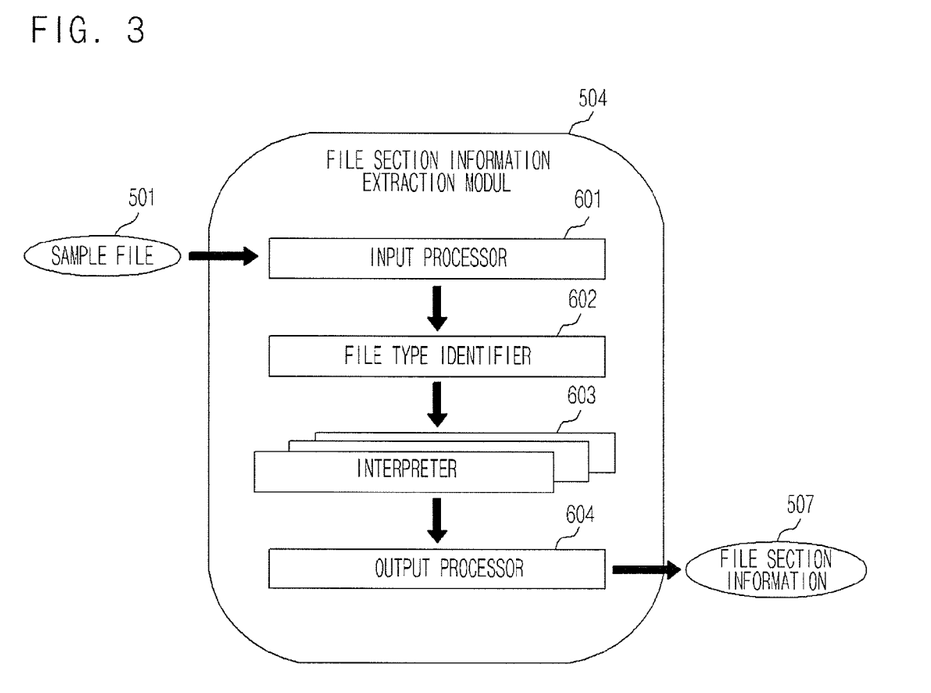
FIG. 3 is a block diagram illustrating a structure of a file section information extraction module according to FIG. 2.

FIG. 3 is a block diagram illustrating a structure of a file section information extraction module according to FIG. 2.

Referring to FIG. 3, a sample file 501 is loaded into a memory in a file section information extraction module 504 through an input processor 601. Next, the file type identifier 602 accesses the memory to identify what file type the sample file 501 is and determines whether the file type can be processed or not. The file type of the sample file 501 can be identified through a method of confirming an original property that each file type has, e.g., a method of confirming a magic number of a file starting portion. Furthermore, the file type identifier 602 is realized in a plug-in form and only the plug-in can be replaced and reused if necessary. Therefore, functionality can be easily added and modified.

If the sample file 501 is identified as a file type that can be processed through the file type identifier 602, the file type identifier 602 calls an interpreter 603 appropriate for the type of the indenitified sample file 501 and then transmits the sample file 501 to the interpreter 603.

A plurality of interpreters 603 is realized in a plug-in form and only the plug-in is replaced and reused if necessary. Therefore, functionality can be easily added and modified. The number of interpreters 603 corresponds to the number of file types to be processed, and each interpreter 603 includes file format information of a corresponding file type and interprets a file section of the sample file 501. The interpreted content is recorded as the file section information 507 through the output processor 507.

Figure 4:
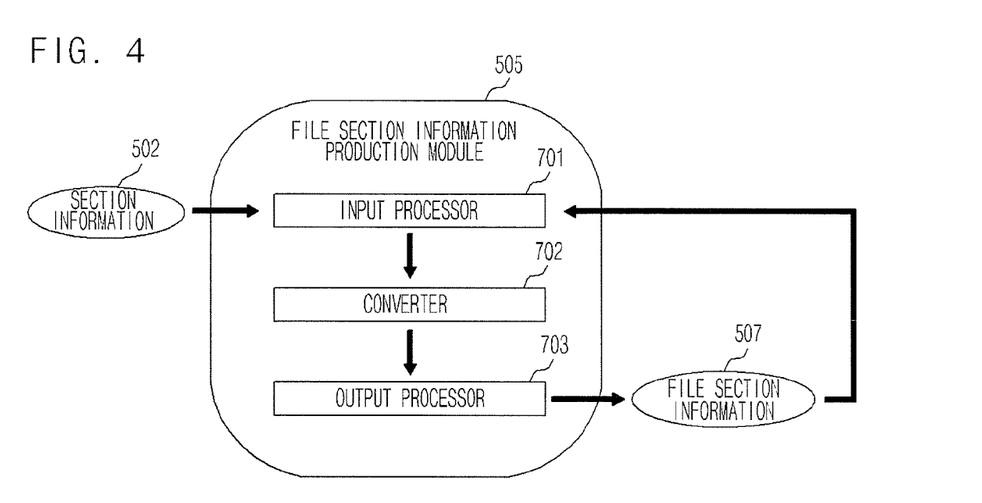
FIG. 4 is a block diagram illustrating a structure of a file section information production module according to FIG. 2.

Referring to FIG. 4, section information 502 is transmitted to a converter 702 through the input processor 701. Moreover, the section information 502 is information that a user defines for a file section as described above.

The converter 702 receives the section information 502 through the input processor 701 and standardizes the inputted contents to be appropriate for the format of the file section information 507.

Then the output processor 703 records the standardized section information 502 as the file section information 507.

The file section information 507 created by the above method can be requested for editing by the file section information production module 505 through the input processor 701. The loaded file section information 507 is displayed to a user and is edited through the section information 502.

The content edited by a user is recorded as the file section information 507 through the converter 702 and the output processor 703 again. Additionally, the content can be re-edited through the same process.

Figure 5:
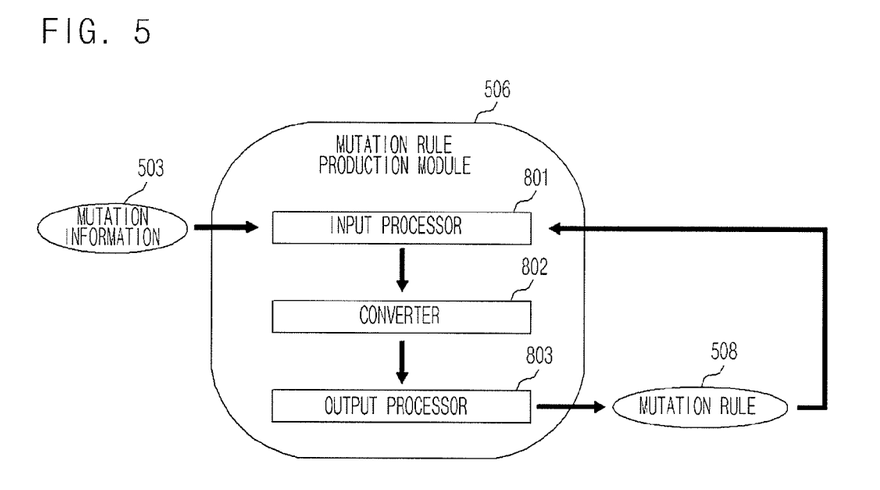
FIG. 5 is a block diagram illustrating a structure of a mutation rule production module according to FIG. 2.

FIG. 5 is a block diagram illustrating a structure of a mutation rule production module according to FIG. 2.

Referring to FIG. 5, mutation information 503 is transmitted to the converter 802 through the input processor 801.

The mutation unit 802 standardizes the inputted mutation information 503 to be appropriate for the format of the mutation rules 508, and the output processor 803 records the standardized mutation information 503 to be appropriate for the mutation rule 508.

The mutation rule 508 is requested again through the input processor 801 by the mutation rule production module 506. The mutation rule 508 loaded into the input processor 801 is displayed to a user, and can be edited through the mutation information 503. The edited contents are recorded as the mutation rule 508 through the converter 802 and the output processor 803 again. Additionally, the contents can be re-edited through the same process.

Figure 6:
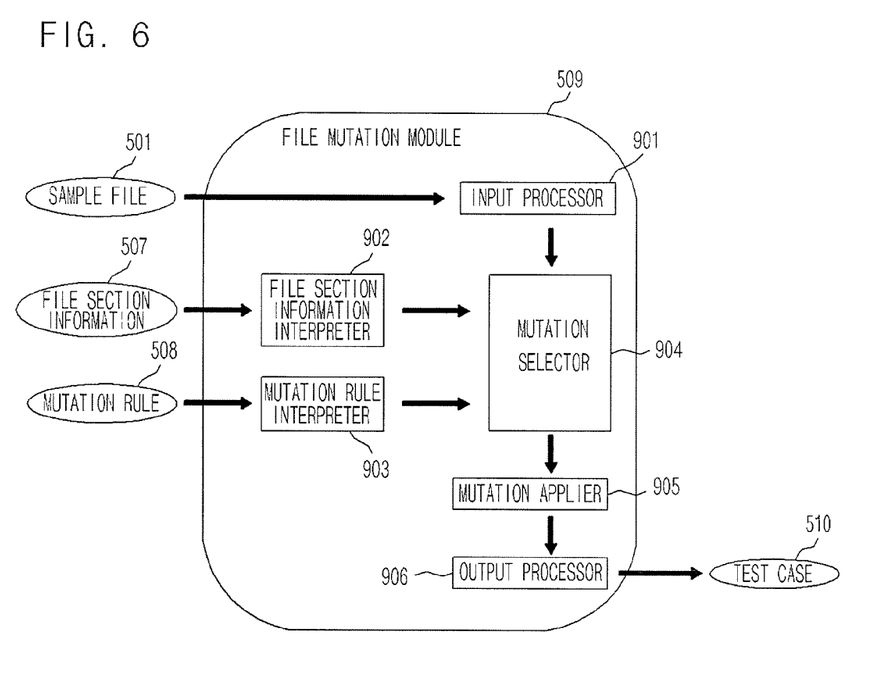
FIG. 6 is a block diagram illustrating a structure of a file mutation module according to FIG. 2.

FIG. 6 is a block diagram illustrating a structure of a file mutation module according to FIG. 2.

Referring to FIG. 6, a sample file 501 is loaded into a memory in the file mutation module 509 through the input processor 901.

The file section information 507 is loaded to the memory of the file mutation module 509 through the file section information interpreter 902 and the loaded file section information is interpreted.

The mutation rule 508 is loaded into the memory of the file mutation module 509 through the mutation rule interpreter 903 and the loaded mutation rule 508 is interpreted.

The mutation selector 904 receives the interpreted file section information 507 and the interpreted mutation rule 508 from the file section information interpreter 902 and the mutation rule interpreter 903, respectively, and receives the sample file 501 from the memory to select a mutation method for each section representing which mutation rule can be applied among mutation rules interpreted for the interpreted file section information.

A mutation applier 905 applies the mutation method to each section selected by the mutation selector 904 in order to execute mutation for each file section information. The mutation of a file executed in the mutation applier 905 is performed on one section or on a plurality of sections according to selection.

The output processor 906 records the execution result mutated in the mutation applier 905 as a file of the test case 510.

Figure 7:
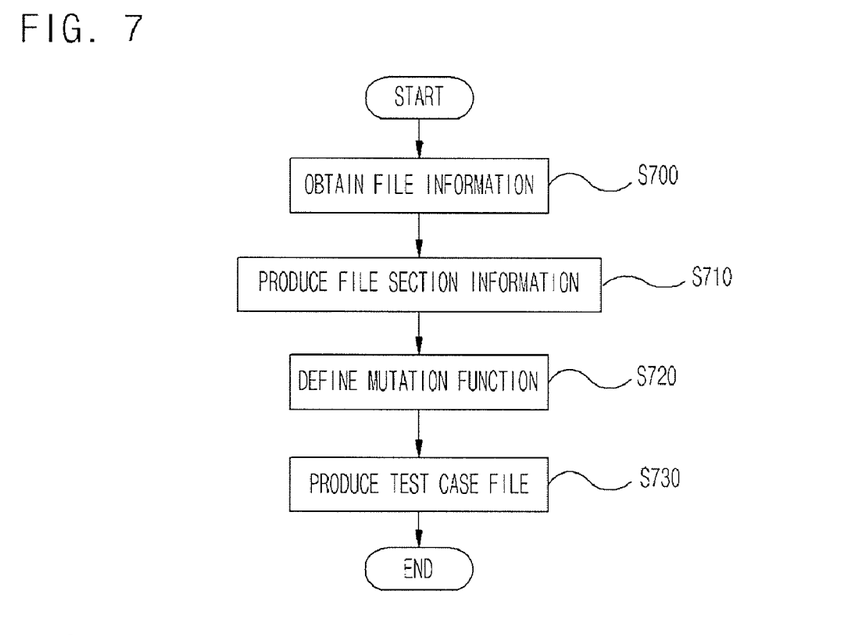
FIG. 7 is a flowchart illustrating a file mutation process using file section information and mutation rules according to one embodiment of the present invention.

FIG. 7 is a flowchart illustrating a file mutation process using file section information and mutation rules according to one embodiment of the present invention.

Referring to FIG. 7, first, the file section information extraction module 504 obtains file section information for a sample file of a known file format in operation S700.

The file section information production module 505 produces file section information with respect to the file of the sample file 501 of unknown file format in operation S710.

The mutation rule production module 506 receives mutation information that a mutation rule is applied and then defines a mutation function that is applied to each data type in operation S720.

The file mutation module 509 receives the sample file 501 and uses the file section information 507 of operation S710 and the mutation rule 508 of operation S720 to mutate the sample file 501, such that a plurality of test case files 510 is generated in operation S730.

At this point, the previously-produced file format information can be edited after operations S700 and S710. That is, when the file format information can be edited after operation S700, the file section information production module 505 corresponds to a case where the file format is known and is used for replacing a portion that is not realized in the file section information extraction module 504, or is used for editing the previously-produced file format information 507. When the file format information can be edited after operation S710, the file section information 507 is created using the section information 502 in the file section information production module 505.

The mutation rule production module 506 receives the mutation information that a mutation rule is applied and creates the mutation rule 508 defining a mutation function that is applied to each data type, or edits the already-made mutation rule 508. This mutation rule 508 is stored in a format of Table 2 or 3.

Figure 8:
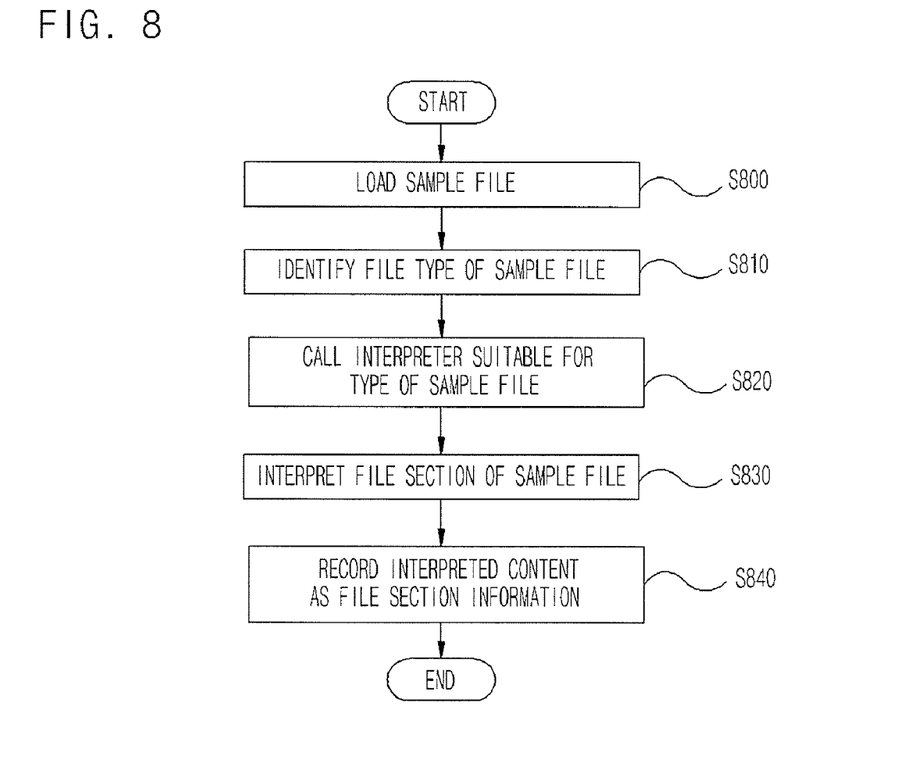
FIG. 8 is a flowchart illustrating processes of a file section information extraction module according to one embodiment of the present invention.

FIG. 8 is a flowchart illustrating processes of a file section information extraction module according to one embodiment of the present invention.

Referring to FIG. 8, the sample file is loaded into a memory in the file section information extraction module 504 in operation S800.

The file type identifier 602 in the file section information extraction module 504 accesses the memory to identify what file type the sample file is in operation S810.

The file type identifier 602 calls the interpreter 603 appropriate for a type of the identified sample file 501 and transmits the sample file 501 to the interpreter 603 in operation S820.

The interpreters 603 are realized in a plug-in form and only the plug-in is replaced and reused if necessary. Therefore, functionality can be easily added and modified. The number of the interpreters 603 corresponds to the number of file types to be processed. Each interpreter 603 interprets a file section of the sample file 501 through file format information of corresponding file type in operation S830.

The content interpreted by the interpreter 603 is recorded as the file section information 507 through the output processor 604 in operation S840.

Figure 9:
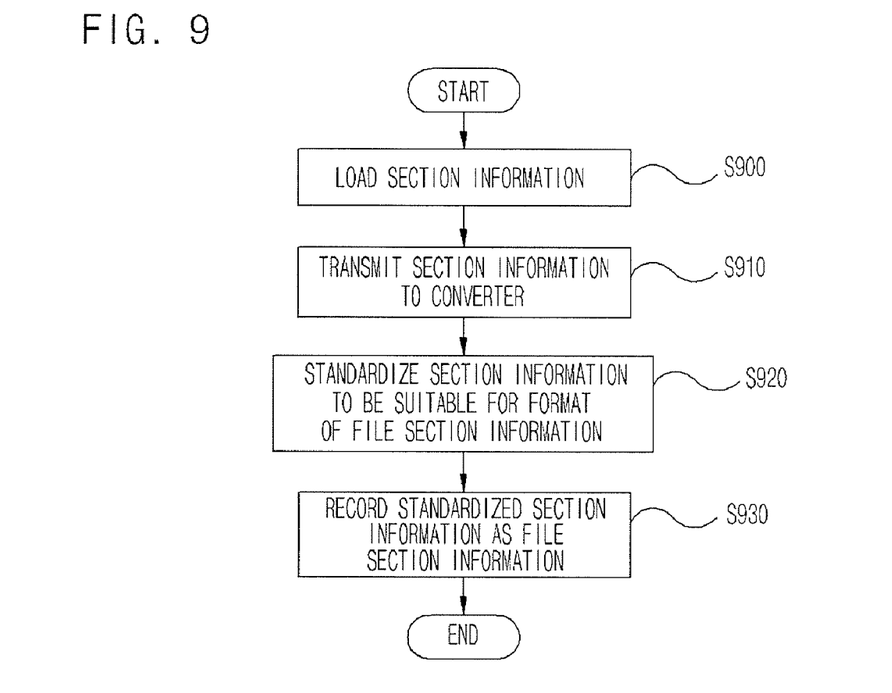
FIG. 9 is a flowchart illustrating processes of a file section information production module according to one embodiment of the present invention.

FIG. 9 is a flowchart illustrating processes of a file section information production module according to one embodiment of the present invention.

Referring to FIG. 9, the section information 502 is loaded into a memory in the file section information production module 505 in operation S900.

The section information 502 passes through the input processor 701 and then is transmitted into the converter 702 in the file section information production module 505. Furthermore, the section information 502 is information that a user defines about a file section as described above.

The converter 702 standardizes contents received and inputted through the input processor 701 to be appropriate for a format of the file section information 507 in operation S920.

Then, the output processor 703 records the standardized section information 502 as the file section information 507 in operation S930.

The file section information 507 created by the above method can be requested for editing by the file section information production module 505 through the input processor 701. The loaded file section information 507 is displayed to a user and edited through the section information 502.

The contents edited by the user are recorded as the file section information 507 through the converter 702 and the output processor 703 again. Additionally, the contents can be re-edited by the same process.

Figure 10:
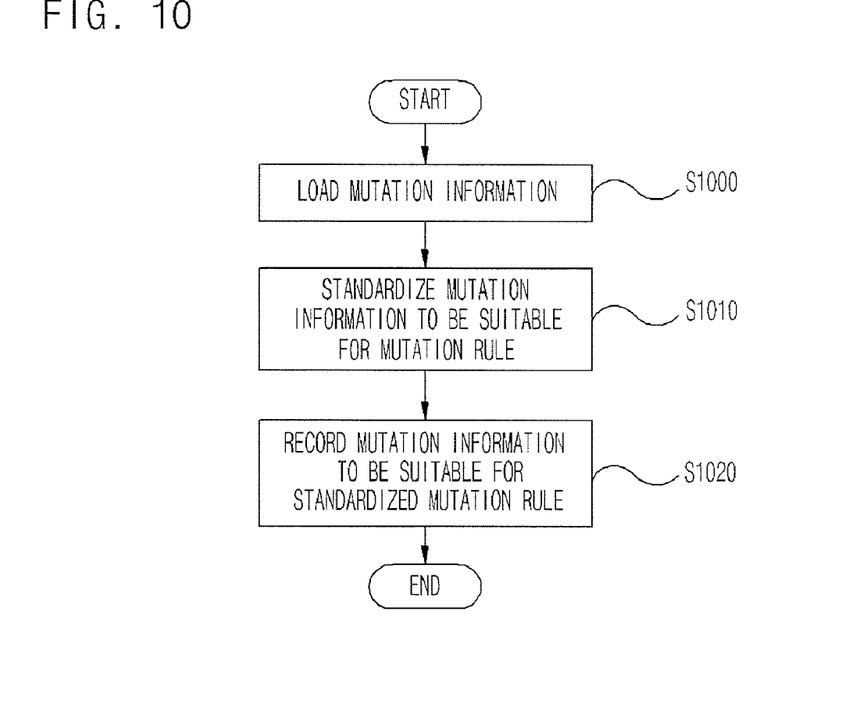
FIG. 10 is a flowchart illustrating processes of a mutation rule production module according to one embodiment of the present invention.

FIG. 10 is a flowchart illustrating processes of a mutation rule production module according to one embodiment of the present invention.

Referring to FIG. 10, a process of producing or editing a mutation rule loads the mutation information into a memory in the mutation rule production module 506 in operation S1000.

The converter 802 in the mutation rule production module 506 receives the mutation information and standardizes the mutation information to be appropriate for a format of the mutation rule in operation S1010.

The output processor 803 in the mutation rule production module 506 records the mutation information to be appropriate for the standardized mutation rule in operation S1020, to change the mutation rule or create a new mutation rule.

Figure 11:
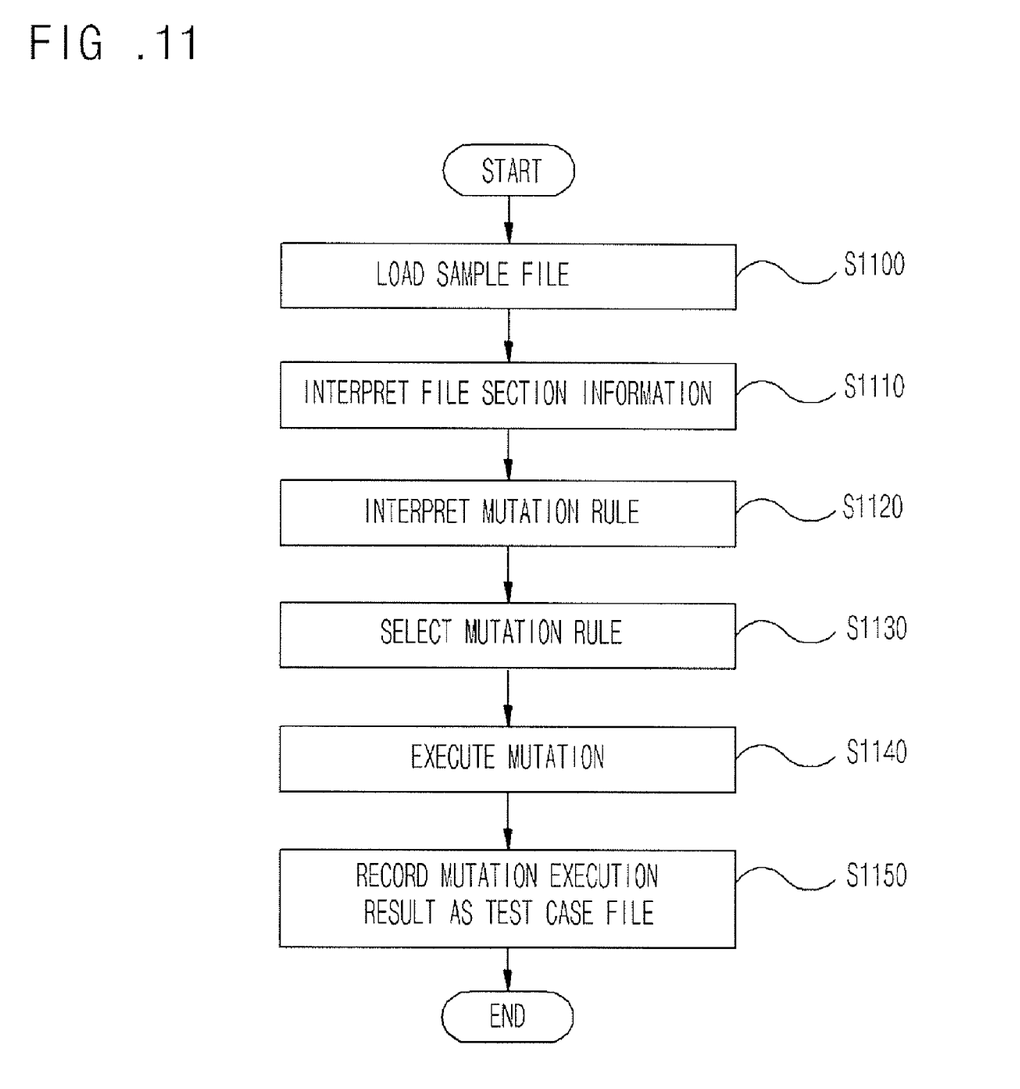
FIG. 11 is a flowchart illustrating processes of a file mutation module according to one embodiment of the present invention.

FIG. 11 is a flowchart illustrating processes of a file mutation module according to one embodiment of the present invention.

Referring to FIG. 11, the sample file is received and loaded into the memory in the file mutation module 509 in operation S1100.

The file section information interpreter 902 in the file mutation module 509 receives the file section information and loads it to the internal memory in order to interpret the mutation rule in operation S1120.

At this point, the file section information includes an ADDR field representing a starting address of a sample file section, a LENGTH field representing the section size of the sample file, an ID field representing an original number that indicates the sample file section, and a TYPE field representing data type used in the same file section.

The selector 904 receives the file section information and the interpreted mutation rule, which are interpreted by the file section information interpreter 902 and the mutation rule interpreter 903, respectively, and the sample file from the memory to select what kind of a mutation rule will be applied among the interpreted mutation rules with respect to the interpreted file section information in operation S1130.

At this point, the mutation rule includes a type field serving as a foreign key and a mutation data field representing a mutation method that will be applied to the type field.

The mutation applier 905 executes mutation according to a mutation rule received from the mutation selector 904 in operation S1140.

The output processor 906 records the mutation execution result from the applier 905 as a test case file in operation S1150.

According to the present invention, through file section information and mutation rules, a mutation method can be differently applied according to a data type at each section of a file. Therefore, more accurate and efficient test case can be generated. Additionally, since a desired file section and a mutation method can be selectively applied, the number of test cases can be drastically reduced compared to a typical random method. Furthermore, since the file section information is used, false positive of file fuzzing due to a wrong file format can be reduced.

According to the present invention, because the file section information and the mutation rules are separated, reusability increases and a test of combining various mutation methods becomes easy. Additionally, since an interpreter of the file section information extraction module is realized in a plug-in form and the file section information and the mutation rules can be created through the section information and the sample file, expandability applied to arbitrary environments can be increased.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A file mutation system using file section information and a mutation rule, the system comprising:
    a file section information extraction module extracting file section information from a sample file when the sample file includes a known formatted file section;
    a file section information production module producing file section information from the sample file when the sample file includes an unknown formatted file section;
    a mutation rule production module receiving mutation information from a user input and producing the mutation rule that comprises at least one data type and at least one corresponding mutation function to be applied in accordance to the data type,
        wherein the file section information has at least one type value selected from the group consisting of integers, strings, and binary data,
        wherein the data type of the mutation rule has a type value identical to that of the file section information and the data type of the mutation rule is a foreign introduced key from the user input which is used to direct mutation of the file section information in accordance to the corresponding mutation function,
        wherein the mutation function is selected from the group consisting of a random value insertion, an integer overflow data set, a buffer overflow data set, and a special string data set; and
    a file mutation module receiving the extracted and/or produced file section information of the sample file and producing test case files by mutating the extracted and/or produced file section information of the sample file using the mutation rule from the mutation rule production module.

2. The file mutation system of claim 1, wherein the file section information production module produces file section information based on information that a user defines for the unknown formatted file section of the sample file and edits the produced file format information.

3. The file mutation system of claim 1, wherein the mutation rule production module edits the produced mutation rule.

4. The file mutation system of claim 1, wherein the file section information extraction module comprises:
    an input process module receiving and loading the sample file into an internal memory;
    a file type identifier accessing the internal memory and determining whether a file type of the sample file can be processed or not;
    a plurality of interpreters receiving the sample file from the file type identifier to interpret the known formatted file section of the sample file using file format information of a corresponding file type, the interpreters being provided a number corresponding to processable file types; and
    an output processor recording contents interpreted by the interpreter.

5. The file mutation system of claim 4, wherein the interpreter and the file type identifier are realized in a plug-in form.

6. The file mutation system of claim 1, wherein the file section information production module comprises:
    an input processor receiving and loading section information user input into an internal memory;
    a converter receiving the section information user input from the input processor and standardizing file section information into a format in accordance to the section information user input; and
    an output processor recording the standardized file section information as file section information.

7. The file mutation system of claim 1, wherein the mutation rule production module comprises:
    an input processor receiving and loading mutation information into an internal memory;
    a converter standardizing the mutation information into an appropriate format for the mutation rule; and
    an output processor recording the standardized mutation information.

8. The file mutation system of claim 1, wherein the file mutation module comprises:
    an input processor receiving and loading the sample file into an internal memory;
    a file section information interpreter receiving the extracted and/or produced file section information and loading the extracted and/or produced file section information into the internal memory;
    a mutation rule interpreter receiving and interpreting the mutation rule and loading the interpreted mutation rule into the internal memory;
    a mutation selector receiving the extracted and/or produced file section information and the interpreted mutation rule and selecting the interpreted mutation rule to be applied with respect to the extracted and/or produced file section information;
    a mutation applier applying a mutation method to execute a mutation of the extracted and/or produced file section information in accordance to the mutation rule; and
    an output processor recording the execution mutation result of the extracted and/or produced file section information into least one of the test case files.

9. The file mutation system of claim 8, wherein the mutation applier executes file mutation on the extracted and/or produced file section of the sample file.

10. A file mutation method using file section information and a mutation rule, comprising:
    obtaining file section information from a sample file when the sample file has a known formatted file section;
    producing file section information from the sample file when the sample file has an unknown formatted file section;
    producing a mutation rule to mutate the obtained and/or produced file section information of the file sample, wherein the mutation rule comprises at least one data type and at least one corresponding mutation function to be applied in accordance to the data type,
        wherein the file section information has at least one type value selected from the group consisting of integers, strings, and binary data,
        wherein the data type of the mutation rule has a type value identical to that of the file section information and the data type of the mutation rule is a foreign introduced key from a user input which is used to direct mutation of the file section information in accordance to the corresponding mutation function, wherein the mutation function is selected from the group consisting of a random value insertion, an integer overflow data set, a buffer overflow data set, and a special string data set; and receiving the sample file as an input to produce a plurality of test case files from the mutated obtained and/or produced file section information of the sample file.

11. The file mutation method of claim 10, further comprising editing previously-produced file format information of the sample file after obtaining or the producing of the file section information.

12. The file mutation method of claim 10, further comprising editing the mutation rule or a previously-produced mutation rule after the producing of the mutation rule.

13. The file mutation method of claim 12, wherein producing the mutation rule comprises:

loading mutation information to a memory in a mutation rule production module;

receiving mutation information to standardize a format of the mutation rule; and recording the mutation information for the standardized format of the mutation rule.

14. The file mutation method of claim 10, wherein obtaining file section information comprises:

loading the sample file to an internal memory of an file section information extraction module;

accessing the internal memory and identifying what file type corresponds to the obtained file section information of the sample file;

calling an interpreter corresponding to the identified file type of the obtained file section information of the sample file;

interpreting the obtained file section information of file section of the sample file by an interpreter; and recording contents interpreted by the interpreter on an output processor as file section information.

15. The file mutation method of claim 10, wherein producing the produced file section information comprises:

loading user input associated with the unknown formatted file section to a memory in a file section information production module;

receiving the user input to standardize the unknown formatted file section of the sample file into the produced file section information having a format in accordance to the user input; and recording the produced file section information of the sample file.

16. The file mutation method of claim 10, wherein producing of the produced file section information and the mutation rule comprises:

receiving and loading the sample file to an internal memory;

receiving and loading the unknown formatted file section from the internal memory to interpret the unknown formatted file section;

receiving and loading the mutation rule from the internal memory to interpret the mutation rule;

receiving the interpreted unknown formatted file section, the interpreted mutation rule and the sample file;

executing mutation of the known formatted file section and/or the unknown formatted file section of the file sample according to the mutation rule; and recording the executed mutation of the known formatted file section and/or the unknown formatted file section of the file sample as at least one of the test case files.

17. The file mutation method of claim 10, wherein the file section information comprises an ADDR field representing a starting address of the known formatted file section and/or the unknown formatted file section of the sample file, a LENGTH field representing a section size of the known formatted file section and/or the unknown formatted file section of the sample file, an ID field representing an original number that indicates the known formatted file section and/or the unknown formatted file section of the sample file, and a TYPE field representing a type of data used in the known formatted file section and/or the unknown formatted file section of the sample file.

18. The file mutation method of claim 10, wherein the mutation rule comprises a type filed serving as a foreign key and a mutation data field representing a mutation method that is to be applied to the type field of the known formatted file section and/or the unknown formatted file section of the sample file.

* * * * *